P. M. KLING.
BOLT.
APPLICATION FILED JUNE 23, 1911.

1,055,330.

Patented Mar. 11, 1913.

3 SHEETS—SHEET 1.

Witnesses:

Inventor
Peter M. Kling
By his Attorneys

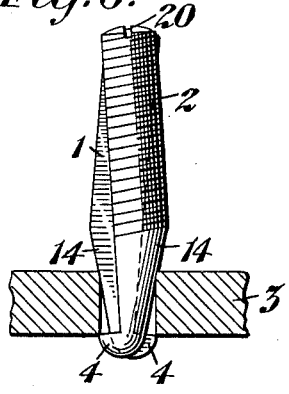
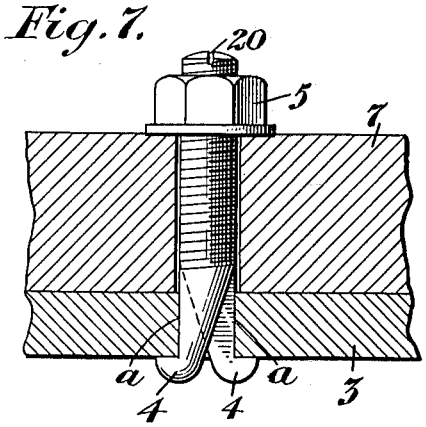
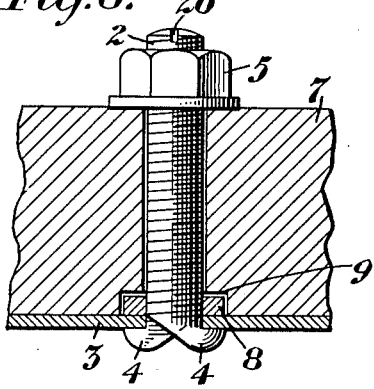
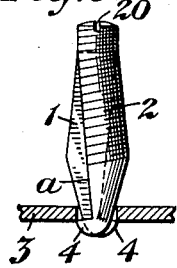
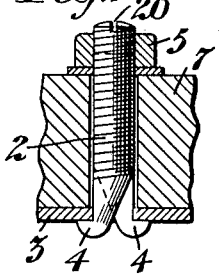
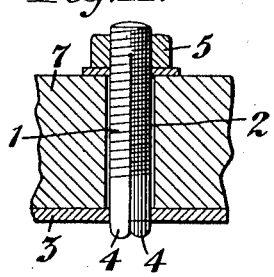

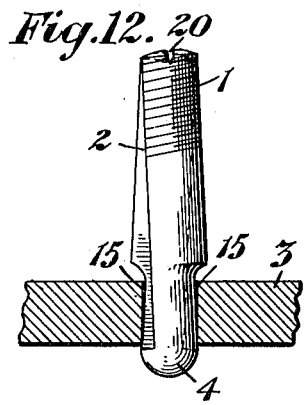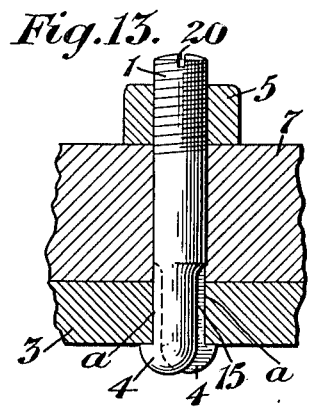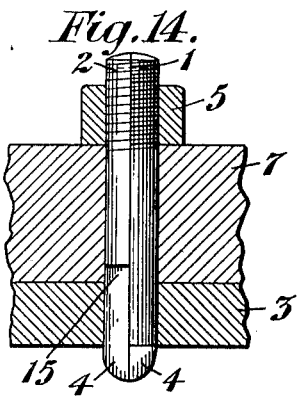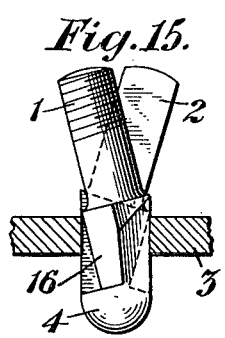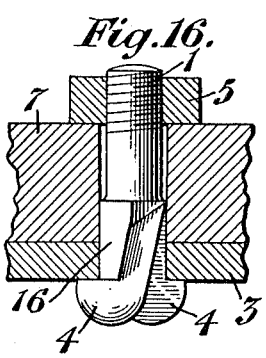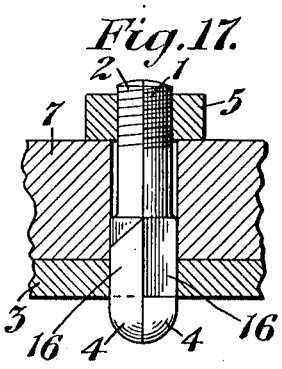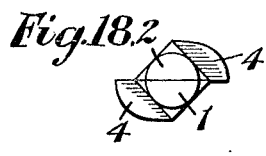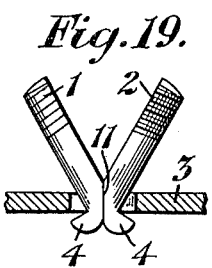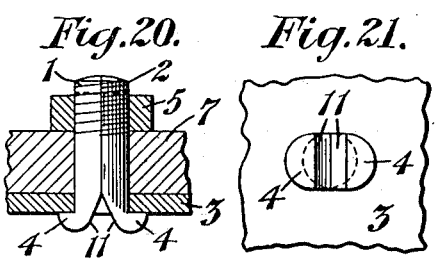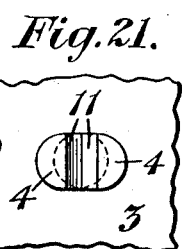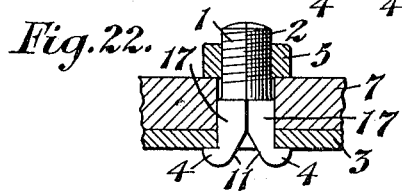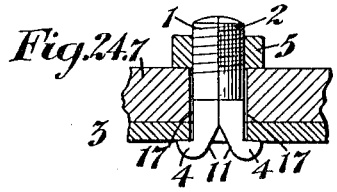

UNITED STATES PATENT OFFICE.

PETER M. KLING, OF ELIZABETH, NEW JERSEY.

BOLT.

1,055,330.  Specification of Letters Patent.  Patented Mar. 11, 1913.

Application filed June 23, 1911. Serial No. 634,882.

*To all whom it may concern:*

Be it known that I, PETER M. KLING, a citizen of the United States, residing at Elizabeth, in the county of Union and State of New Jersey, have invented certain new and useful Improvements in Bolts, of which the following is a full and clear specification, illustrated in the accompanying drawing, the particular novelty of the invention being more fully pointed out in the annexed claims.

My invention relates to bolts by means of which objects may be attached to sheet metal or plate, or to pipes, into which, owing to the thinness of the metal, thread can not be cut, and where it is impossible to put the bolt through the hole in the metal from the rear. Bolts of this kind may be for instance used in modern office buildings where all the doors and window trimmings are made out of sheet steel, or in modern all steel railroad cars where it is often desirable to attach trimmings to the sheet metal walls or the like, after such wall plating has been mounted in the car. Moreover its application is equally broad for joining together piping or tubing to form railings, gates, or the like, where at the T and similar connections no tight joints are required. In all such cases it has been difficult heretofore to fasten or lock the head of a screw bolt in such metal without drilling an unduly large hole through the metal.

My present invention relates in particular to a bolt for the purposes above mentioned in which the bolt head can be fastened or locked back of the sheet metal after putting the bolt through a hole in the sheet metal not substantially larger than the diameter of the bolt itself, so that when the object to be fastened to the sheet metal has been clamped tight against the metal by the nut, the bolt will seat itself tight in the hole through the metal.

In the accompanying drawings I have shown several modifications of how my invention may be reduced to practice, these modifications also showing how the principle involved in my invention may be applied to various forms of bolts which are required to fasten objects of different dimensions, such as for instance wood or thin metal to the sheet metal.

Figure 1:
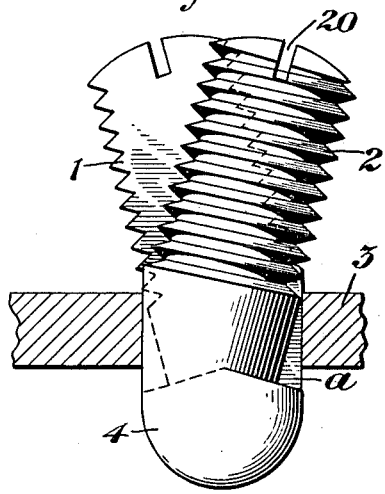
Figure 2:
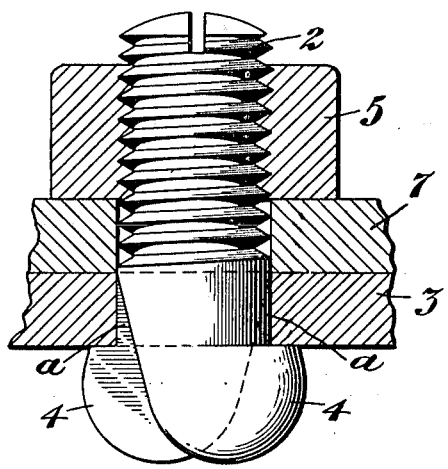
Figure 3:
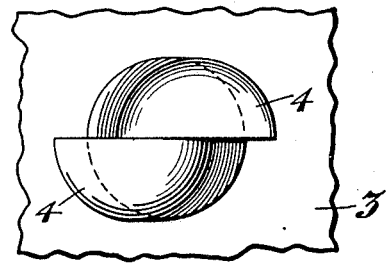
Figure 4:
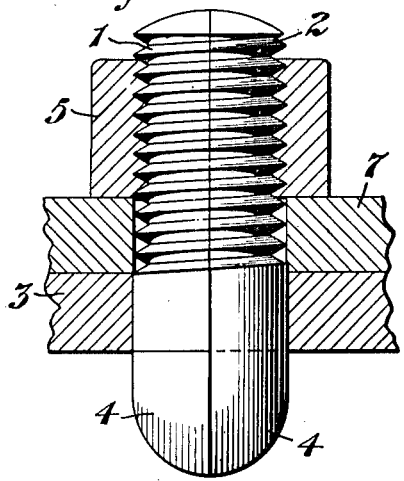
Figure 5:
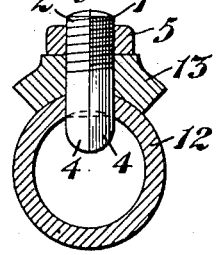

In these drawings Figure 1 is a side elevation of the bolt in the position in which it is inserted through the hole in the sheet metal. Fig. 2 is a like view, showing the bolt and the object to be supported by the bolt attached to the sheet metal. Fig. 3 is a bottom view of the structure shown in Fig. 2. Fig. 4 is an elevation of the bolt shown in Fig. 2, the bolt being turned 90°. Fig. 5 is a view of the bolt shown in Fig. 4, in smaller scale, showing how the bolt may be used for attaching objects to pipes. Figs. 6 and 7 correspond with Figs. 1 and 2 and show a modification of the form of the bolt adjacent to its head. Fig. 8 is a view of the bolt shown in Figs. 2 and 7, illustrating means for holding the bolt in the metal before the object to be supported by the bolt is attached to it. Figs. 9, 10 and 11 correspond to Figs. 1, 2 and 4 respectively, and show another modification of the bolt. Figs. 12, 13 and 14 correspond in their views with Figs. 1, 2 and 4 and show another modification in the form of the lower portion of the bolt. Figs. 15, 16 and 17 show similar views to those of Figs. 1, 2 and 4, illustrating how the novel features of my invention may be applied to a bolt with a square neck. Fig. 18 is a plan view of the bolt shown in Fig. 16. Figs. 19, 20 and 21, show another modification of the bolt corresponding to the views shown in Figs. 1, 2 and 3. Figs. 22 and 24 correspond in their views to Fig. 20 and show the application of the form shown in Figs. 19 and 20 to square neck bolts. Figs. 23 and 25 correspond with Figs. 22 and 24 respectively and show plan views of the bolt illustrated in these figures.

The bolt illustrated in Figs. 1 to 4 consists of two complementary threaded portions or sections 1 and 2; each section having at its end which is to be inserted in the sheet metal 3 a nose or head 4, which is offset from the middle line of the half bolt, as shown in Fig. 1. As shown in all the modifications, one of the characteristic features of the bolt is that each section has its cross-sectional area adjacent to its head smaller than the cross-sectional area of the remainder of the bolt section. For instance the portion of each bolt half shown in Fig. 1, is tapered toward the end on the side diametrically opposite to the side toward which the head is offset. The heads of the two bolt halves 1 and 2 are offset in opposite directions and the size of each head 4 determined by the extent of the offset is such that, when the two bolt halves 1 and 2 are laterally shifted upon each other, as shown in Fig. 1, and the two heads register they will easily slip through a hole in the sheet metal of the size of the stem of the bolt. It will now be seen that when the two bolt halves are re-assembled to receive the nut, after the bolt has been inserted through the hole and so as to complete the round bolt, the two heads separate in opposite directions back of the metal and thus lock the bolt back of the metal, and it will be also noted that the farther nut 5 (Fig. 2) is screwed down on to the bolt the more this nut tends to hold the two sections in locking position and to press them against the walls of the hole in the sheet metal. Fig. 2 for example shows how a piece of wood 7 may be clamped against the sheet metal 3 by means of a bolt just described. Fig. 3 shows a bottom view of the bolt locked back of the sheet metal. It is obvious that the two bolt sections do not have to be necessarily inserted simultaneously but that they may be entered separately through a hole of the size of the bolt, so long as, while one section is already in the hole, the head of the other section in entering it is brought into lateral alinement with the section already in the hole.

In Fig. 5 I have illustrated how the bolt described hereinbefore may be applied for fastening an object 13 for any purpose to a pipe 12, it being necessary only to bore a hole through the pipe of the size of the assembled bolt and slip the two bolt sections through the hole in the manner previously described and to then attach the nut 5 to the bolt after the object 13 has been slipped over the bolt. The pipe connections for mechanical structures may be thus easily made without cutting threads onto the pipe and using T and L connections as has been done heretofore in making railings, gates, or the like.

It is often desirable to attach a number of bolts in line with each other to a piece of sheet metal before the object to be fastened to the sheet metal is attached. For instance in case of a long wood trimming with a number of holes in it, the carpenter naturally will first attach all the bolts to the wall and then slide the trimming simultaneously over all the bolts and then tighten the nuts. The form of bolt illustrated in Figs. 1 to 4 will stay, however, tight in the hole only if the nut is screwed onto it, so that the two halves are drawn in alinement thereby, and the bolt in this form would therefore be unsuited for the purposes just described without an auxiliary attachment. Therefore in order to fasten a bolt in the sheet metal 3 so that it will stand out straight from the metal, to facilitate the placing of objects onto the bolts before nut 5 can be placed onto the bolt, I provide an auxiliary nut 8 which is very low and is screwed onto the two halves after they have been inserted into the hole in the sheet metal, and thus by screwing nut 8 close to the sheet metal as shown in Fig. 8, the two bolt halves are held in alinement and the bolt stands straight out from the sheet metal. The wood trimming 7, which may be for instance attached to the sheet metal 3 by means of such bolts, may easily be countersunk as shown at 9 to receive the auxiliary nut 8.

The bolt illustrated in Figs. 1 to 4 is shaped at the end which enters the sheet metal so that it will slide through a piece of plate metal the thickness of which is approximately equal to one half the diameter of the bolt, a proportion which is frequently used in the art for attaching sheet metal, where generally the size of the bolt is chosen twice the thickness of the sheet metal. A bolt of this proportion as shown in Figs. 1 to 4, will not readily pass through plate metal appreciably thicker than one half the size of the bolt. Where such requirement is made, in other words, in case the bolts are to be used on very heavy plate metal, the neck of the bolt is somewhat lengthened as is for instance shown in Figs. 6 and 7. In these figures the neck portion of each section opposite to the side toward which the head of the section extends, is provided with a very long taper as shown at 14. Thus as shown in Figs. 6 and 7 the bolt may pass through a hole in plate metal even thicker than the diameter of the bolt. Of course the lower neck portion closely adjacent to the head is made slightly weaker thereby but bolts of this particular construction as shown in Figs. 6 and 7 are intended principally for only small strain so that the practicability of this bolt is not impaired. For the same purpose as shown and described with reference to Figs. 6 and 7, the bolt may also be shaped as shown in Figs. 12 to 14, where instead of tapering the off side 14 of each section gradually toward the head in a very long taper the neck may also be reduced uniformly for a considerable distance as shown at 15 in Figs. 12 to 14.

I find it practical to compose the bolt of two entirely separate halves down to sizes of about one quarter of an inch. For smaller bolts I find it more practical to split the bolt only part way, so that the bolt remains integral at the end from where the nut is screwed on to it. Otherwise the bolt may be constructed with regard to its locking features the same as shown in Figs. 1 to 5. Such partially split bolt is illustrated in Figs. 9, 10 and 11 which correspond with the views shown in Figs. 1, 2 and 4. Bolts of such small size may easily be bent into the shape shown in Fig. 9, so that the two heads 4 will slip through the hole in the sheet metal 3 and again be straightened out with a pair of pliers after the bolt has been inserted into the hole, and the nut thereafter holds the two halves in position as shown in Fig. 10.

For certain purposes it is desirable to provide bolts with a square neck (for instance so-called carriage bolts). The characteristic features of my invention may be also applied to this kind of bolt as is shown for instance in Figs. 15 to 18, where 16 indicates the square neck. The bolt is thereby split longitudinally in a plane coinciding with the diagonal plane through the square neck; otherwise the bolt may be shaped exactly as shown in Figs. 1 to 14. A plan view of the bolt in assembled condition is shown in Fig. 18.

In case of an entirely split bolt instead of shifting the two halves 1 and 2 laterally of each other in order to insert the bolt in the hole they may be tilted away from each other for this purpose. In this event the bolt halves or sections 1 and 2 are shaped at their lower ends so that their cross-sectional area, the same as described above, is smaller adjacent to the heads than elsewhere, but simultaneously so that the diameter of each section at right angles to the dividing plane of the section is smaller adjacent to the head than elsewhere. This result may be preferably accomplished as shown in Figs. 19 to 21 where the two contacting surfaces of the two bolt halves are tapered away from each other as shown at 11. When the bolt is inserted the two bolt halves are in this case tilted away from each other so that the tapering surfaces 11 touch each other as shown in Fig. 19, whereby the heads 4 of the two halves approach each other sufficiently to permit the insertion of the two halves into the hole of the metal 3, if desired, simultaneously. When the two bolt halves are assembled to receive the nut the heads separate and lock behind the metal, whereby the hole in the sheet metal may be made of such small dimension that the bolt is locked tight in the hole when the nut 5 is screwed onto it. A bottom view of the bolt in attached position is shown in Fig. 21.

Correspondingly to the manner in which a square neck bolt as illustrated in Figs. 15 to 17 has been adapted to the modification shown in Figs. 1 to 14, such square neck bolt may also be adapted to the form shown in Figs. 19 to 21. For instance a square neck bolt may be divided in the diagonal plane of the neck so that the two heads of the sections extend at right angles to this plane and oppositely to each other as shown in Figs. 22 and 23 to insert such bolt through a square hole similar to the manner in which the bolt illustrated in Figs. 19 to 21 is inserted and attached. Moreover the bolt may be longitudinally divided into its two sections on a plane in parallel to two opposite sides of the square neck, whereby again the heads of the two sections extend in opposite direction to each other at right angles to the dividing plane of the bolt. Such form is shown in Figs. 24 and 25, the operations for inserting the bolt being likewise similar to those shown in Figs. 19-21.

When bolts of the character illustrated and described hereinbefore are attached in the manner described to plate metal or tubing where the head cannot be held from the other side to prevent the bolt from turning, while the nut is tightened, I have provided two means which will prevent the bolt from turning. First by taking care to maintain the edge $a$ formed by the cylindrical portion of the bolt neck and the dividing plane of the two sections in each section, sharp. These edges $a$ as shown for instance in Figs. 1, 2, 6, 7 and 13 will bite into the walls of the hole of the plate 3 and thus prevent the bolt from turning. However, very often the nut fitting quite close to the thread of the bolt and these edges $a$ not being very tightly pressed against the metal when the nut is still at the upper portion of the bolt, I prefer to provide a slot 20 in the upper end of the bolt, which slot as shown in Figs. 1, 2, 6, 7, 8, 9, 10, 12 and 13, runs substantially transversely to the dividing plane of the bolt and by inserting for instance a screw driver into this slot the bolt may be easily prevented from turning while the nut is tightened until the bolt heads have been drawn sufficiently tight against the metal and also the neck of the bolt adjacent to the heads has been pressed sufficiently tight against the walls of the hole so that edges $a$ come more readily into action, whereafter the nut may be easily tightened as far as desired, without the aid of a screw driver. Of course also in the bolt shown in Figs. 19 and 20, a slot 20 may be employed in the upper end of the bolt though in these figures this slot is not shown since it runs at right angles to the direction in which the view of these figures is taken.

What I claim is:

1. A screw bolt of the character described, comprising two complementary bolt sections each having a head offset to one side oppositely to the direction in which the head of the other section is offset, and each section having its cross-sectional area adjacent to said head smaller than the area of the remainder of the bolt section to permit said heads when laterally alined to enter a hole not substantially larger than the diameter of the bolt, said heads moving away from each other when the two complementary bolt sections are assembled to receive the nut.

2. A screw bolt of the character described, comprising two complementary bolt sections, each having a head offset in one direction a suitable distance beyond the cylindrical surface of the bolt and rising therefrom and extending opposite to the direction in which the head of the other section extends, each bolt section having its cross-sectional area adjacent to said head smaller than the area of the remainder of the bolt section to permit said heads when laterally alined to enter a hole not substantially larger than the diameter of the bolt, said heads moving away from each other when the two complementary bolt sections are assembled to receive the nut.

3. A screw bolt of the character described, comprising two complementary bolt sections, each having a head offset in one direction a suitable distance beyond the cylindrical surface of the bolt and rising therefrom and extending opposite to the direction in which the head of the other section extends, and each section tapering toward the head on the side opposite to that to which the head is offset to permit such heads when laterally alined to enter a hole not substantially larger than the diameter of the bolt, said heads moving away from each other when the two complementary bolt sections are assembled to receive the nut.

4. A screw bolt of the character described, comprising two complementary bolt sections each having a head offset substantially in the direction of the plane in which the bolt is divided into said sections and each head being offset oppositely to the other head, the diameter of each section in the direction of said plane being smaller adjacent to its head than at the remainder of the section to permit said heads when laterally alined to enter a hole not substantially larger than the diameter of the bolt, said heads moving away from each other in said plane when the two complementary bolt sections are assembled to receive the nut.

5. A screw bolt of the character described, comprising two complementary bolt sections each having a head offset a suitable distance beyond the cylindrical surface of the bolt substantially in the direction of the plane in which the bolt is divided into said sections, and each head being offset oppositely to the other head, the diameter of each section in the direction of said plane being smaller adjacent to its head than at the remainder of the section to permit said heads when laterally alined to enter a hole not substantially larger than the diameter of the bolt, said heads moving away from each other in said plane when the two complementary bolt sections are assembled to receive the nut.

6. A screw bolt adapted to be locked in sheet metal, comprising two complementary longitudinal bolt halves, each having a head offset a suitable distance beyond the cylindrical surface of the bolt in the direction of the dividing plane of said halves and each head being offset oppositely to the other head and each half tapering toward its head on the side opposite from where its head is located to permit said heads when laterally alined to enter a hole in the metal not substantially larger than the diameter of the bolt, said heads moving away from each other when the two complementary bolt halves are assembled to receive the nut and lock the bolt behind the sheet metal whereby the bolt portion of each half adjacent to the head, seats itself tightly against the periphery of the hole in the metal and whereby the edge formed on each half by the dividing plane and the cylindrical portion of the half tends to bite into the metal to prevent the bolt from turning in the hole when the nut is attached.

7. A screw bolt of the character described, comprising two complementary bolt sections each having a head offset to one side oppositely to the direction in which the head of the other section is offset, and each section having its cross sectional area adjacent to said head smaller than the area of the remainder of the bolt section to permit said heads when registering to enter a hole not substantially larger than the diameter of the bolt, said heads moving way from each other when the two complementary bolt sections are assembled to receive the nut, said bolt having at its other end a slot running substantially transversely to the dividing plane of said sections to permit the holding of said bolt at said end while the nut is tightened.

8. A screw bolt of the character described, comprising two complementary bolt sections each having a head offset to one side oppositely to the direction in which the head of the other section is offset, and each section having its cross sectional area adjacent to said head smaller than the area of the remainder of the bolt section to permit said heads when registering to enter a hole not substantially larger than the diameter of the bolt, said heads moving away from each other when the two complementary bolt sections are assembled to receive the nut, said bolt having at its other end means for holding said bolt at said end while the nut is tightened.

PETER M. KLING.

Witnesses:
H. ALFRED JANKE,
M. G. CRAWFORD.